United States Patent
Bezerra et al.

(10) Patent No.: US 6,531,005 B1
(45) Date of Patent: Mar. 11, 2003

(54) HEAT TREATMENT OF WELD REPAIRED GAS TURBINE ENGINE COMPONENTS

(75) Inventors: Patricia S. A. Bezerra, Cincinnati, OH (US); Thomas J. Kelly, Cinicnnati, OH (US)

(73) Assignee: General Electric Co., Cincinnati, OH (US)

( * ) Notice: Subject to any disclaimer, the term of this patent is extended or adjusted under 35 U.S.C. 154(b) by 37 days.

(21) Appl. No.: 09/715,785

(22) Filed: Nov. 17, 2000

(51) Int. Cl.⁷ .................................................. C21D 6/00
(52) U.S. Cl. ....................................... 148/516; 148/529
(58) Field of Search ................................... 148/516, 529

(56) References Cited

FOREIGN PATENT DOCUMENTS

JP           60128209        *    7/1985

* cited by examiner

*Primary Examiner*—Sikyin Ip

(57) ABSTRACT

An article, made of a material such as a iron-nickel-base alloy, is weld repaired, and then heat treated. The heat treatment includes heating the weld-repaired portion to a first hold temperature of at least about 1775 degrees Fahrenheit, cooling the weld-repaired portion to a temperature of 1025 degrees Fahrenheit or less, heating the weld-repaired portion at a rate of at least about 10 degrees Fahrenheit per minute or greater, to a second hold temperature of at least about 1525 degrees Fahrenheit, cooling the weld-repaired portion to a third hold temperature of about 1425 degrees Fahrenheit or less, and cooling the weld-repaired portion to a fourth hold temperature of about 1225 degrees Fahrenheit or less.

17 Claims, No Drawings

HEAT TREATMENT OF WELD REPAIRED GAS TURBINE ENGINE COMPONENTS

BACKGROUND OF THE INVENTION

This invention relates to repair of articles, and more particularly to repair of gas turbine engine components manufactured from certain iron-nickel base and nickel-base alloys.

A number of components of gas turbine engines are subject to high temperature environments during engine operation, and are also required to maintain minimum strength properties during engine operation. Such components are often fabricated of relatively expensive metal alloys which have been developed to withstand high temperature environments while maintaining required strength properties. Accordingly, if the component is damaged, either during manufacturing or due to service conditions, it is desirable to repair the component if at all possible, so as to avoid the expense of a new component.

One repair procedure which can be used for repairing damaged components involves welding, such as to repair a cracked component. Welding, however, can affect the metallurgical properties of the base material from which the component is manufactured. Post weld heat treatments can be used to at least partially restore desirable metallurgical characteristics of the base material close to the weld.

Still, it can be difficult to weld repair components manufactured from certain iron-nickel base and nickel base alloys. In particular, repair of components manufactured from certain iron-nickel base alloys can be difficult to weld repair due to lack of a suitable post weld heat treatment.

BRIEF SUMMARY OF THE INVENTION

The present invention, in one form, provides a method for heat treating a weld repaired article formed of an iron-nickel base alloy. The component can be a new, unused part cracked or otherwise damaged in the manufacturing process, or a used part cracked or otherwise damaged after service. The method is believed to be especially useful in weld repair of gas turbine engine components formed of INCOLOY 909, though it may also be useful in the repair of other iron-nickel and nickel base alloys, such as RENE 41, INCOLOY 903, INCOLOY 907, AND INCONEL 718.

The method, in one form, includes heat treating a component formed of an iron-nickel base alloy having one or weld repaired portions. The steps of heat treating can include heating the repaired portion to a first hold temperature of at least about 1775 degrees Fahrenheit; cooling the repaired portion to about 1025 degrees Fahrenheit or less; heating the repaired portion, at a rate of at least about 10 degrees Fahrenheit per minute or greater, to a second hold temperature of at least about 1525 degrees Fahrenheit; cooling the repaired portion to a third hold temperature of about 1425 degrees Fahrenheit or less; and cooling the repaired portion to a fourth hold temperature of about 1225 degrees Fahrenheit or less.

The method, in one embodiment, includes the steps of providing a component formed of INCOLOY 909, identifying one or more cracks in the component, weld repairing the cracks, and post weld heat treating the component. The step of heat treating can include heating the repaired portion to a first hold temperature of between about 1775 and about 1825 degrees Fahrenheit and holding the component at the first hold temperature for between about 50 to about 70 minutes; furnace cooling the component to between about 975 and about 1025 degrees Fahrenheit; heating the component at a rate of at least about 10 degrees Fahrenheit per minute to a second hold temperature of between about 1525 and about 1575 degrees Fahrenheit and holding the component at the second hold temperature for between about 50 and about 70 minutes; furnace cooling the component to a third hold temperature of between about 1375 and about 1425 degrees Fahrenheit and holding the component at the third hold temperature for between about 4 hours and 40 minutes to about 5 hours and 20 minutes; furnace cooling the component to a fourth hold temperature between about 1175 and about 1225 degrees Fahrenheit and holding the component at the forth hold temperature for between about 50 to about 70 minutes; and cooling the component to about 500 degrees Fahrenheit.

DETAILED DESCRIPTION OF THE INVENTION

The present invention is useful in the repair of articles formed of iron-nickel or nickel base alloys, and in particular, gas turbine engine components formed of iron-nickel or nickel base alloys. The following description is provided with reference to repair of a compressor stator case, but it will be understood that the present invention is also applicable to other components. All temperatures provided are in degrees Fahrenheit unless otherwise noted.

The term "furnace cooling" means resetting a furnace temperature control to a lower temperature and allowing the article in the furnace to cool to that lower temperature.

The term "weld repaired" refers to an article repaired at one or more weld joints, as well as articles having one or more cracks, voids, or other like defects filled using a weld filler material, using any suitable welding technique, including but not limited to gas shielded tungsten arc welding.

The article to be repaired can be, for example, a stator case assembly, such as a compressor rear stator case of the type found in a CFM56 model gas turbine engine manufactured by CFM International. In particular, the present invention is useful in repair of flow path rub land cracks in an INCOLOY 909 compressor rear stator case. INCOLOY is a registered trademark of International Nickel Company. INCOLOY 909 is an iron-nickel-cobalt alloy with a silicon addition and containing niobium and titanium for precipitation hardening. The nominal composition is 38% Ni, 42% Fe, 13% Co, 4.7% Nb, 1.5% Ti, 0.4% Si, 0.03%Al, and 0.01% C.

The stator case assembly can comprise upper and lower halves which are assembled at split-line flanges. The stator case halves can be assembled and the rub lands can be inspected, ground to the proper dimensions, reinspected, reground if necessary, and weld repaired. An inspection, such as fluorescent penetrant inspection, can be performed to locate cracks in the rub lands. Cracks can be removed by weld filling the cracks and regrinding the lands to remove excess weld material. Suitable weld material includes but is not necessarily limited to 0.045–0.063 inch diameter weld wire, such as Incoloy 907 or 909 weld wire. Weld repair can be made in multiple passes to provide multiple layers, which together, provide sufficient thickness once the weld area has been blended smooth, such as by grinding.

Once the cracks or other defects have been weld repaired, the stator case upper and lower halves, assembled together by bolting at split-line flanges, are heat treated in a vacuum furnace according to the present invention.

In order to monitor the temperature of the stator case halves during heat treatment, four thermocouples can be used. For instance, thermocouples can be placed at the 3, 6, 9, and 12 o'clock positions around the assembled stator case halves, with the thermocouple at the 3 o'clock position at the horizontal split line flange in the lower case half and the thermocouple at the 9 o'clock position at the horizontal split line flange in the upper case half. In the heat treatment process set forth below, a temperature hold period is not started until all four thermocouples register in the hold temperature range.

The assembled stator case halves are heated in the vacuum furnace to a first hold temperature of between about 1775 to 1825° F. (968 to 996° C.). The stator case halves are held at the first hold temperature for between about 50 to about 70 minutes. The stator case halves are then furnace cooled to a temperature of between about 975 to about 1025° F. (524 to 552° C.). Optionally, this temperature can be held for up to about 30 minutes.

The stator case halves are then heated at a rate of at least about 10 degrees Fahrenheit per minute to a second hold temperature between about 1525 to about 1575° F. (829 to 857° C.), and held at the second hold temperature for between about 50 to about 70 minutes.

The stator case halves are then furnace cooled to a third hold temperature of between about 1375 and about 1425° F. (746 to 774° C.). The stator case halves are held at the third hold temperature for at least 2 hours, more particularly at least 4 hours, and more particularly between about 4 hours, forty minutes and 5 hours, twenty minutes.

Next, the stator case halves are furnace cooled to a fourth hold temperature of between about 1175 to 1225° F. (635 to 663° C.), and held at the fourth hold temperature for between about 50 to about 70 minutes. The stator case halves can then be cooled to 500 degrees Fahrenheit before removing the case halves from the furnace.

The present invention has been described in connection with specific examples and embodiments which are intended to be typical of rather than in any way limiting on the scope of the present invention. Those skilled in the arts associated with this invention will understand that it is capable of variations and modifications without departing from the scope of the appended claims.

What is claimed is:

1. A method for heat treating an article, the method comprising the steps of:
    providing an article having a weld repaired portion;
    heating the repaired portion to a first hold temperature of at least about 1775 degrees Fahrenheit;
    cooling the repaired portion to about 1025 degrees Fahrenheit or less;
    heating the repaired portion at a rate of at least about 10 degrees Fahrenheit per minute or greater, to a second hold temperature of at least about 1525 degrees Fahrenheit;
    cooling the repaired portion to a third hold temperature of about 1425 degrees Fahrenheit or less; and
    cooling the repaired portion to a fourth hold temperature of about 1225 degrees Fahrenheit or less.

2. The method of claim 1 wherein the article comprises an iron-nickel-base alloy.

3. The method of claim 1, wherein the article comprises an alloy having a nominal composition of 38 percent nickel, 42 percent iron, 13 percent cobalt, 4.7 percent niobium, 1.5 percent titanium, 0.4 percent silicon, 0.03 percent aluminum, and 0.01 percent carbon.

4. The method of claim 1 wherein the first hold temperature is between about 1775 and about 1825 degrees Fahrenheit.

5. The method of claim 1 wherein the repaired portion is held at the first hold temperature for between about 50 and about 70 minutes.

6. The method of claim 1 wherein the repaired temperature is cooled to a temperature of between about 975 and about 1025 degrees Fahrenheit subsequent to heating to the first hold temperature and prior to heating to the second hold temperature.

7. The method of claim 1 wherein the second hold temperature is between about 1525 and about 1575 degrees Fahrenheit.

8. The method of claim 1, wherein the repaired portion is held at the second hold temperature for between about 50 and about 70 minutes.

9. The method of claim 1 wherein the third hold temperature is between about 1375 and about 1425 degrees Fahrenheit.

10. The method of claim 1 wherein the repaired portion is held at the third hold temperature for between about 4 hours, forty minutes and about 5 hours, 20 minutes.

11. The method of claim 1 wherein the fourth hold temperature is between about 1175 and about 1225 degrees Fahrenheit.

12. The method of claim 1 wherein the repaired portion is held at the fourth hold temperature for between about 50 minutes to about 70 minutes.

13. The method of claim 1 wherein the repaired portion is heated from a temperature of between about 975 and about 1025 degrees Fahrenheit to the second hold temperature at the rate of at least about 10 degrees Fahrenheit per minute.

14. A method for heat treating an article, the method comprising the steps of:
    providing an article comprising a nickel containing alloy, the article having a weld repaired portion;
    heating the repaired portion to a first hold temperature between about 1775 and about 1825 degrees Fahrenheit;
    holding the repaired portion at the first hold temperature for between about 50 and about 70 minutes;
    furnace cooling the repaired portion to temperature of between about 975 and about 1025 degrees Fahrenheit;
    heating the repaired portion at a rate of at least about 10 degrees Fahrenheit per minute or greater, to a second hold temperature of between about 1525 to about 1575 degrees Fahrenheit;
    furnace cooling the repaired portion to a third hold temperature of between about 1375 and about 1425 degrees Fahrenheit; and
    furnace cooling the repaired portion to a fourth hold temperature of between about 1175 and about 1225 degrees Fahrenheit.

15. The method of claim 14 wherein the article comprises an iron-nickel-base alloy.

16. The method of claim 14, wherein the article comprises an alloy having a nominal composition of 38 percent nickel, 42 percent iron, 13 percent cobalt, 4.7 percent niobium, 1.5 percent titanium, 0.4 percent silicon, 0.03 percent aluminum, and 0.01 percent carbon.

17. The method of claim 14 comprising:
    weld repairing at least a portion of a rub land associated with a stator case assembly; and
    heat treating the stator case assembly in a vacuum furnace.

* * * * *